United States Patent [19]

Garofano et al.

[11] 4,116,757

[45] Sep. 26, 1978

[54] SOLAR EVAPORATION OF ALKALINE TRONA-PROCESS WASTE POND LIQUORS WITH ACID BLACK 2 AND ACID GREEN 1

[75] Inventors: Norman R. Garofano, Syracuse, N.Y.; Ronald G. Bitney, Rock Springs, Wyo.

[73] Assignee: Allied Chemical Corporation, Morris Township, N.J.

[21] Appl. No.: 742,821

[22] Filed: Nov. 18, 1976

[51] Int. Cl.$^2$ .............................................. B01D 1/00
[52] U.S. Cl. .............................. 159/47 WL; 159/1 S; 23/302 T; 203/57; 423/425
[58] Field of Search .......... 159/47 R, 47 WL, 47 UA, 159/DIG. 6, DIG. 20, 1 S, 1 G, 1 RW; 23/295 S, 300, 302 R, 302 T, 303; 423/425; 203/DIG. 1, 57, 51, 52; 202/234

[56] References Cited

U.S. PATENT DOCUMENTS

| | | | |
|---|---|---|---|
| 2,383,763 | 8/1945 | Bloch et al. | 23/295 |
| 3,361,186 | 1/1968 | Wild et al. | 203/DIG. 1 |
| 3,966,541 | 6/1976 | Sadan | 159/47 R |

OTHER PUBLICATIONS

Bloch et al., "Solar Evaporation of Salt Brines," Industrial & Engineering Chem., vol. 43, #7, pp. 1544–1553, Jul. 31, 1951.

*Primary Examiner*—Norman Yudkoff
*Attorney, Agent, or Firm*—Anthony J. Stewart; Gerard P. Rooney

[57] ABSTRACT

A process is provided for increasing the rate of solar evaporation of water from alkaline trona-process waste liquors which comprises introducing to the waste liquors an effective amount of a dye selected from the group consisting of Acid Black 2 and Acid Green 1, and subjecting said waste liquors to solar radiation for evaporation of water therefrom.

4 Claims, No Drawings

SOLAR EVAPORATION OF ALKALINE TRONA-PROCESS WASTE POND LIQUORS WITH ACID BLACK 2 AND ACID GREEN 1

BACKGROUND OF THE INVENTION

1. Field of the Invention

This invention relates to the acceleration of solar evaporation of water and more specifically to the acceleration of solar evaporation of water from trona-process waste pond liquors by use of certain soluble inert dyes.

2. DESCRIPTION OF THE PRIOR ART

Naturally occuring trona, consisting mainly of sodium sesquicarbonate ($Na_2CO_3 \cdot NaHCO_3 \cdot 2H_2O$), is found in Wyoming and other parts of the world. There are various methods of recovering soda ash (sodium carbonate) from trona ore, for example, calcination. Generally the soda ash is recovered by digesting the calcined trona with water to dissolve out the soda ash content of the calcined ore. The resulting solution containing dissolved sodium carbonate is then treated to remove insolubles and the treated solution is then passed to evaporation units for crystallization of sodium carbonate monohydrate which is then separated and dried to produce the desired soda ash product. A portion of the waste liquors from the crystallization stage may be recycled to the digestion step. However, to limit the quantity of impurities in the system, a portion of the crystallization liquor is combined with the waste liquor from the muds separation stage and the mixture is discharged to an evaporation pond to reduce the alkaline waste liquor volume by solar evaporation, thereby preventing the pollution of the environment and utilizing radiant solar energy.

The general method of handling the large amounts of waste water produced in this process is to pass the waste liquors to a series of ponds where, by action of solar radiation, the volume of the liquid is decreased by evaporation of water therefrom. As the water is evaporated from these liquors, impurities present in the original liquor settle to the bottom as a thick sludge. The ponds are periodically cleaned to remove the sludge which has formed.

The major expense in use of such solar evaporation methods is the large surface area required to permit the solar evaporation to proceed from these ponds at a rate which allows continuous handling of the large volumes of water employed in typical commercial processes for manufacturing soda ash by the above-described method.

Accordingly, an increase in the rate of evaporation of these liquors would greatly assist in the processing of these waste liquors by the solar evaporation method, decreasing the surface area required for handling of the liquors produced in the trona process and thereby greatly decreasing the expense associated with the size and operation of these ponds.

While the prior art has employed soluble dyes in brines (e.g., sodium chloride and magnesium chloride brines) to increase rates of solar evaporation, no attempt has been made to define those dyes which would be suitable for use in the alkaline waste liquors produced in a trona process. See, for example, U.S. Pat. No. 2,383,763 and 3,099,630; Kane, G. P. et. al., "Acceleration of Solar Evaporation by Dyes"; *Trans. Indian Inst. Chem. Engr.*, Vol. 3, 105-8 (1949-50); M. R. Bloch, et. al., "Solar Evaporation of Salt Brines"; Ind. & Engr. Chem., Vol. 43, 1544-1553 (1951); and Riva, B., Annali di Chimica (Rome), Vol. 50, 1391-1400 (1960).

SUMMARY OF THE INVENTION

According to the present invention, a process is provided for increasing the rate of solar evaporation of water from alkaline trona-process waste liquors which comprises introducing to the waste liquors an effective amount of a dye selected from the group consisting of Acid Black 2 dyes and Acid Green 1 dyes, such as Nigrosine 128B Crystals and Naphthol Green B, respectively, and subjecting said waste liquors to solar radiation for evaporation of water therefrom.

It has been surprisingly found that the above dyes are stable in these alkaline trona-process liquors and the dyes increase the absorption of solar radiation of the said liquors such that the rate of solar evaporation of water from said liquors is accelerated by an amount of up to 40 percent and more over that of similar untreated liquors.

DETAILED DESCRIPTION OF THE INVENTION

The composition of trona-process waste liquors which may be treated in accordance with the present invention may vary widely depending on the amount of soluble and insoluble matter present in the trona that is mined, the type of process used to recover the sodium carbonate values from the ore, the degree of recovery, and a wide variety of other factors. The general range and typical composition of trona-process waste liquors, exclusive of water-insoluble matter, may be represented as follows:

| Component Measured | Composition in Grams per Kilogram of Soln. | |
| --- | --- | --- |
| | General Range | Typical Waste Liquor |
| Alkalinity as Sodium Carbonate, $Na_2CO_3$ | 10-80 | 76.1 |
| Alkalinity as Sodium Bicarbonate, $NaHCO_3$ | 2-110 | 5.4 |
| Sulfate as Sodium Sulfate, $Na_2SO_4$ | 0.5-13 | 1.5 |
| Chloride as Sodium Chloride, NaCl | 0.01-2 | 0.075 |
| Total Dissolved Solids (in Weight Percent) | 1-17% | 8.4% |
| Solution pH | 9-11 | 10.3 |

Generally, therefore, a trona-process waste liquor treated in accordance with the present invention will comprise an aqueous medium containing from about 1 to about 10 weight percent sodium carbonate, from about 0.1 to about 10 weight percent sodium bicarbonate, from about 0.01 about 1.5 weight percent sodium sulfate, from about 0.001 to about 0.5 weight percent sodium chloride, traces of other soluble alkali metal salts and soluble organics.

In order to be selected as a suitable dye, a soluble dye, in very small concentrations, must be capable of increasing the absorption of visible and infrared radiation in the trona-process waste liquor while at the same time being stable in the dyed solution to the bleaching action of sunlight. Thus, the dye must be substantially inert, that is, it must not chemically combine with any component of the liquid to form a precipitate and thereby remove part of the dye from solution. Such a precipitate decreases the dye's effectiveness in absorbing radiation and renders the use of the dye very uneconomical.

Further, the selected dye must possess high solubility in the alkaline waste liquor and be effective in its role of increasing absorption of solar radiation over the wide range of temperatures normally encountered in operation of such solar ponds (e.g., from a temperature at which the pond freezes to a temperature of about 80° to 95° C at which waste liquors are normally discharged to trona-process evaporation ponds).

The soluble dyes which have been found useful in the practice of the invention are Acid Green 1, (Color Index No. 10020), (also known, in the dye trade, ans Naphthol Green B) which comprises a compound having the following formula:

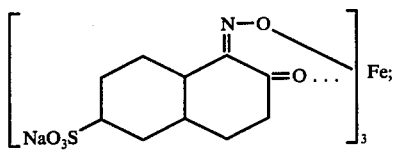

and Acid Black 2 (Color Index No. 50420) which comprises the sodium or alkali metal salts of sulfonated brands of Solvent Black 5 (Color Index No. 50415), known by the classical name "Nigrosine Spirit Soluble," and/or Solvent Black 7 (Color Index No. 50415B), the free base. Nigrosine 128B crystals, available commercially, is an Acid Black 2 dye.

Naphthol Green B may be prepared by nitrosating 2-naphthol-6-sulfonic acid and converting the resulting nitrosated acid to the iron sodium salt by conventional methods. See, for example, the method recited in U.S. Pat. No. 2,383,763. Naphthol Green B is marketed by various dye manufacturers and is commercially available. Acid Black 2 may be one of several closely related compounds and may be formed by either (1) heating nitrobenzene, aniline and aniline hydrochloride with iron or copper at a temperature of from 180° to 200° C.; or by (2) heating nitrophenol or the nitro-cresols, aniline and aniline hydrochloride with iron at 180° to 200° C., in accordance with conventional procedures to obtain Nigrosine Spirit Soluble. Subsequently, Acid Black 2 may be prepared by sulfonating various brands of the above Nigrosine Spirit Solubles and converting the products to their respective alkali metal salts.

The exact amount of the selected dye which is added to trona-process waste liquors in accordance with the process of the present invention may vary widely depending on the increase in evaporation desired, the particular dye selected, the composition of the waste liquor and other factors. Generally, however, the dyes of the present invention are employed in the waste liquors in an amount of from about 0.2 to 2000 ppm dye, and preferably from about 2 to 500 ppm dye, basis the liquid volume of the waste liquor as equivalent weight of water.

The selected dye may be admixed with the trona-process waste liquor in a batchwise, semi-continuous or continuous manner either prior to the liquor's being passed to the waste pond for evaporation of water or may be added directly to the liquor in the pond itself. The former method is preferred to ensure more even distribution of the dye in the liquor.

While, as described, both of the dyes used in the process of this invention significantly increase the rate of evaporation of trona-process waste liquors, it has unexpectedly been discovered that Acid Green 1, e.g. Naphthol Green B, serves an additional beneficial function of reducing the concentration of suspended insoluble material in the waste liquor.

The process of the present invention may be further illustrated by reference to the following examples. In these examples a simulated trona-process waste liquor was prepared by adding 81 grams of aged calcined trona ore having a generaly composition of 81.5 weight percent sodium carbonate, 5.6 weight percent sodium bicarbonate and 12.9 weight percent insoluble matter (with minor traces of soluble matter, including kerogenaceous organic material) together with 750 grams of hot water at 80° C. containing 1.25 grams of sodium sulfate and 0.5 gram of sodium chloride dissolved therein. The pH value of the resultant mixture, upon cooling and settling, was found to be 10.5. In admixing dyes to the liquors, the selected quantity of inert soluble dye was added to the simulated evaporation pond liquor. The dyes employed in these examples were concentrated aqueous solutions (i.e., water containing 1 gram per liter of dye) which concentrated solutions were added directly to the samples of simulated trona-process waste liquor while these liquors were hot and prior to cooling and settling. The addition of the dyes in parts per million (ppm) was based upon the liquid volume calculated as equivalent weight of water.

EXAMPLE 1

To determine the effect of Nigrosine 128B (C.I. No. 50420) and Naphthol Green B (C.I. No. 10020) on rates of absorption of solar radiation in alkaline, trona-pond waste liquors, samples of simulated waste liquor were prepared as above containing selected amounts of the dyes indicated. After filtering to remove solids these samples were placed in individual 10-mm cells and the absorption of incident radiant light energy was measured with a Cary model 14 spectrophotometer with air as a reference. The results are summarized in the following Table I.

As indicated by the data of Table I, in the visible light region, the absorption of visible radiation for the undyed, simulated liquor in the absence of dye was low and did not differ significantly from that of distilled water. In contrast, about a five-fold increase in the amount of visible light absorbed resulted from the addition of 40 parts per million of dye to the simulated evaporation pond liquor.

Absorption of infrared energy for undyed, simulated evaporation pond liquor, without added dye, was also nearly equivalent to that of distilled water, whereas the samples of simulated evaporation pond liquor containing 40 parts per million of dye showed an increase absorption of infrared light energy of about 15 percent over that of the undyed liquor.

The addition of these dyes to simulated evaporation pond liquor increased the overall absorption of incident radiant light energy significantly, in the combined regions of visible and infrared light over that amount absorbed by the undyed, simulated waste liquor.

TABLE I

PERCENT ABSORPTION* OF INCIDENT LIGHT ENERGY

| Wavelength** (nm) | Distilled Water | Simulated Waste Liquor Containing | | |
|---|---|---|---|---|
| | | No Dye | 40 ppm Nigrosine 128B | 40 ppm Naphthol Green B |
| Visible Spectrum | | | | |
| 350 | 15 | 20 | 65 | 82 |
| 400 | 10.3 | 12 | 52.5 | 68 |
| 450 | 9.1 | 10.5 | 55.5 | 46 |
| 500 | 9.1 | 10 | 58 | 24 |
| 550 | 7.8 | 8.5 | 55.5 | 20 |
| 600 | 7.8 | 8.5 | 51 | 37 |
| 650 | 7.5 | 8 | 44 | 61 |
| 700 | 7.5 | 8.2 | 36.5 | 69 |
| Median Absorption in Visible Region | 8.9 | 10.2 | 52.5 | 47.4 |
| Infrared Spectrum | | | | |
| 750 | 10.1 | 10.7 | 31 | 66 |
| 800 | 11.2 | 11.8 | 26 | 53 |
| 850 | 14 | 14.2 | 24.5 | 37 |
| 900 | 14 | 14.2 | 22.5 | 24 |
| 950 | 27.5 | 35 | 37 | 32.5 |
| 1000 | 40 | 37 | 40 | 38.5 |
| 1050 | 24 | 23.5 | 25 | 22.5 |
| 1100 | 24 | 26.5 | 27 | 24 |
| 1150 | 60 | 68 | 68 | 64 |
| 1200 | 74.2 | 73 | 73.8 | 72.5 |
| 1250 | 69.8 | 69 | 68.5 | 68.5 |
| 1300 | 74.5 | 77 | 76 | 75 |
| 1350 | 96 | 96.2 | 96.5 | 96 |
| Median Absorption I.R. Region | 40.5 | 41.8 | 46.0 | 49.4 |
| GRAND MEDIAN ABSORPTION (VISIBLE & I.R.) | 27.9 | 29.2 | 47.6 | 49.6 |

NOTE
*Percent Absorption in 10 mm Cell = 100 × (1-Transmittance)
**nm = nanometers

EXAMPLE 2

To determine the stability of selected dyes in alkaline trona-pond waste liquors exposed to sunlight, a series of mixtures of simulated evaporation pond liquor were prepared as above using increasing dye concentrations. The absorption of filtered portions of the mixtures were measured through the visible and infrared spectrum using the test method of Example 1. The initial mixtures were exposed to direct sunlight, in glass bottles, for six hours (average ambient air temperature was 26° C). Filtered portions of the resultantly exposed mixtures were re-examined for their absorption of visible and infrared light energy. The results thereby obtained, summarized in Table II, show Nigrosine 128B (C.I. No. 50420) and Naphthol Green B (C.I. No. 10020) to be substantially stable to sunlight in the simulated liquors.

TABLE II

STABILITY TO SUNLIGHT

| Dosage (ppm) | Nigrosine 128B Dye Median Absorption (%) | | Dosage (ppm) | Naphthol Green B Dye Median Absorption (%) | |
|---|---|---|---|---|---|
| | Initial | Exposed | | Initial | Exposed |
| 0 | 29.1 | 27.1 | 0 | 28.3 | 27.4 |
| 3.25 | 30.5 | 27.4 | 0.2 | 28.6 | 27.8 |
| 11 | 33.4 | 29.2 | 2 | 30.2 | 28.3 |
| 40 | 47.6 | 45.1 | 10 | 35.8 | 30.7 |
| 140 | 79.6 | 78.8 | 40 | 49.6 | 41.2 |

EXAMPLE 3

Employing the procedure described above, separate 2-liter samples of simulated evaporation pond liquor were prepared, the first sample containing 50 ppm of Nigrosine 128B dye (C.I. No. 50420), and the second sample containing no dye. Each sample was placed in an open-top two-liter glass beaker and exposed, outdoors, for six continuous days and nights in the month of September at Syracuse, New York. The rates of evaporation were monitored accurately through the use of a conventional sidearm device to measure changes in liquor level, in millimeters, in each beaker. After six days of outdoor exposure, a 39% increase in the average evaporation rate was noted to result from the use of the Nigrosine dye. The data are summarized in Table III.

TABLE III

OUTDOOR EVAPORATION RATE

| Day Number | Time of Day (Hours) | Change in Liquid Level Height (mm) | | | | Equivalent Rate of Evaporation (lb. H₂O/sq.ft./day) | |
|---|---|---|---|---|---|---|---|
| | | Undyed Solution | | Dyed Solution - 50 ppm Nigrosine 128B | | | |
| | | Increment | Total | Increment | Total | Undyed | Dyed |
| 0 (Start Measurement) | 8:30 AM | 0 | 0 | 0 | 0 | — | — |
| | 4:00 PM | −6.2 | −6.2 | −7.2 | −7.2 | 4.20 | 4.89 |
| 1 | 9:00 AM | −5.4 | −11.6 | −6.4 | −13.6 | 1.56 | 1.85 |
| | 4:00 PM* | +4.6 | −7.0 | +4.0 | −9.6 | — | — |
| 2 | 9:00 AM* | −1.5 | −8.5 | −2.4 | −12.0 | — | — |

TABLE III-continued

| Day Number | Time of Day (Hours) | OUTDOOR EVAPORATION RATE ||||  Equivalent Rate of Evaporation (lb. H₂O/sq.ft./day) ||
|---|---|---|---|---|---|---|---|
| | | Change in Liquid Level Height (mm) |||||  |
| | | Undyed Solution || Dyed Solution - 50 ppm Nigrosine 128B || | |
| | | Increment | Total | Increment | Total | Undyed | Dyed |
| | 4:00 PM* | +7.3 | −1.2 | +6.0 | −6.0 | — | — |
| 5 | 8:30 AM* | −14.7 | −15.9 | −18.0 | −24.0 | 1.12 | 1.23 |
| 6 | 8:30 AM | −5.0 | −20.9 | −5.2 | −29.2 | 1.03 | 1.07 |

Six Day Average
 Evaporation Rate:
  Undyed Solution = 2.6 gallons per minute per acre
  Dyed Solution = 3.6 gallons per minute per acre
 Increase in Evaporation Rate = about 39% with 50 ppm Nigrosine 128B
 Decay Rate of Dye Concentration - 0.75 ppm/day
NOTE
*= Rain shower

EXAMPLE 4

To determine the effect which Nigrosine 128B dye (C.I. No. 50420) has on solution temperature, the temperature of the dyed and undyed solution samples in Example 3 were measured on the third day of the six-day experiment, yielding the data set forth in Table IV.

TABLE IV

| Property Measured | Time on the Third Day of Exposure ||||||||
|---|---|---|---|---|---|---|---|---|
| | 9 AM | 10 AM | 11AM | Noon | 1 PM* | 2 PM | 3 PM | 4 PM |
| Air Temp.(° C) | 24.4 | 27.0 | 27.8 | 27.5 | 28.5 | 21.0 | 25.0 | 25.7 |
| Difference (° C) from Air Temp. for soln. | | | | | | | | |
| a) Without Dye | −0.4 | 0.0 | +3.1 | +5.5 | +4.5 | +5.8 | +3.2 | +1.8 |
| b) With Dye | +0.6 | +2.8 | +4.5 | +6.0 | +4.9 | +7.0 | +5.8 | +3.8 |

NOTE * = Rain shower.

The increase in radiant energy absorbed by the dyed solution over that absorbed by the undyed solution is exhibited by the consistently higher temperature of the dyed solution. This difference shows that increased absorbed heat more than compensates for heat losses due to relatively faster evaporation in the case of the dyed solutions.

EXAMPLE 5

To determine the effect of Nigrosine 128B dye (C.I. No. 50420) on the evaporation rate of waste effluent from a commercial soda-from-trona operation, waste liquor having the following average composition was placed in six round plastic tubs each 22 inches in diameter and having a depth of 13 inches: 6.3 weight percent sodium carbonate, 0.45 weight percent sodium bicarbonate, 0.125 weight percent sodium sulfate, and 0.007 weight percent sodium chloride, plus trace amounts of other solubles. Each tube was buried flush to the ground and filled to within one inch of the top rim with the waste liquor. After absorbance readings were taken on samples from each tub, sufficient Nigrosine 128B dye was added to make solutions of the following concentrations: 0, 1, 5, 15, 25 and 50 parts per million, basis equivalent liquid weight as water. The solutions were monitored for 18 days. Changes in liquid level height, absorbance and solution temperatures were recorded using the test methods discussed above. The results are summarized in Table V.

Dye concentrations of 5 ppm or greater resulted in an increased evaporation rate ranging between about 8 and 17 percent relative to the undyed solution. The solutions with 5 to 50 ppm dye concentration demonstrated an average decay rate of about 0.4 ppm per day for the 18-day test period. The temperature measurements (average of daytime temperatures) demonstrated that the dyed solutions had a surface temperature in the general range of about 4° to 6° F warmer than an untreated waste pond liquor. The higher surface temperatures for the dyed solutions demonstrated that more radiant energy was absorbed by the dyed solutions than for undyed solutions, and the increased heat absorption more than compensated for the heat losses due to relatively faster evaporation rate.

Qualitative observations of the latter three dyed solutions, 15, 25 and 50 ppm, indicated favorable freeze-thaw characteristics, in comparison to the lower two and undyed solutions. They appeared to freeze over slower than the other solutions during colder weather. Thdy also appeared to thaw more rapidly than the other solutions upon return to above freezing weather conditions.

TABLE V

| Initial Dye Conc. (ppm) | Initial Alkalinity (as wt. % Na₂CO₃) | Absorbance at 500 nm in 10 mm Cell ||| Est. Rate of Dye Decay (ppm) per day | Average Daytime Temperature of Tubs (° F) |||| Total Volume of Water Evap. (ml) | Calculated Evaporation Rate, Basis Water Loss || Increase in Evap. Rate (%) |
|---|---|---|---|---|---|---|---|---|---|---|---|---|---|
| | | Before Dye Addition | After Dye Addition | End of Test | | At The Surface | At 1-inch Depth | At 2-inch Depth | At 3-inch Depth | | (lb H₂O per sq.ft. per day) | (gpm per acre) | |
| 0 | 6.1 | .16 | .16 | .08 | — | 37.5 | 37 | 36.5 | 36 | 4670 | 0.217 | 0.787 | — |
| 1 | 5.7 | .15 | .21 | .08 | 0.14 | 38.5 | 38.5 | 38 | 38 | 4220 | 0.196 | 0.711 | (−10) |
| 5 | 5.9 | .15 | .30 | .16 | 0.25 | 42 | 41 | 40 | 38 | 5020 | 0.233 | 0.846 | + 8 |

TABLE V-continued

| Initial Dye Conc. (ppm) | Initial Alkalinity (as wt. % $Na_2CO_3$) | Absorbance at 500 nm in 10 mm Cell | | | Est. Rate of Dye Decay (ppm) per day | Average Daytime Temperature of Tubs (° F) | | | | Total Volume of Water Evap. (ml) | Calculated Evaporation Rate, Basis Water Loss | | Increase in Evap. Rate (%) |
|---|---|---|---|---|---|---|---|---|---|---|---|---|---|
| | | Before Dye Addition | After Dye Addition | End of Test | | At The Surface | At 1-inch Depth | At 2-inch Depth | At 3-inch Depth | | (lb $H_2O$ per sq.ft. per day) | (gpm per acre) | |
| 15 | 7.5 | .20 | .51 | .36 | 0.38 | 42.5 | 42 | 39 | 36 | 5360 | 0.249 | 0.903 | +15 |
| 25 | 6.2 | .17 | .75 | .52 | 0.56 | 43.5 | 43 | 39 | 36 | 5130 | 0.238 | 0.864 | +10 |
| 50 | 7.0 | .21 | .49 | .41 | 0.76 | 43.5 | 42.5 | 39.5 | 37 | 5470 | 0.254 | 0.922 | +17 |

EXAMPLE 6

A series of simulated evaporation pond liquor samples were prepared containing increasing increments of Naphthol Green B dye. The hot mixtures were placed in separate 500-ml graduated cylinders and the cylinders immersed in a 60° C. hot water bath. The mixtures which contained granular and silt-like insoluble matter, normally encountered in soda-ash from-trona operations, were agitated, vigorously, by vertical action of a plunger-like device to disperse the insoluble solid materials in each test cylinder. Fifteen minutes after the indicated agitation was stopped samples of the supernatent liquor above the settled solids were siphoned from each of the test cylinders at the same height level (about 14 centimeters from the bottom of the cylinder). The percent weight insoluble material in each of the samples was determined by standard gravimetric procedures. The results, as shown in Table VI below, indicated use of the Naphthol Green B (C.I. No. 10020) favorably reduced the concentration of suspended insoluble material in the simulated evaporation pond waste liquor in which this dye was used.

TABLE VI
EFFECT OF DYE ON SEDIMENTATION

| Concentration of Naphthol Green B (ppm) | Suspended Insoluble Material 15 Minutes After Agitation Stopped (Weight Percent of Sample Liquor) |
|---|---|
| 0 | 0.030 |
| 0.2 | 0.031 |
| 2.0 | 0.022 |
| 10 | 0.026 |
| 40 | 0.018 |

EXAMPLE 7

A series of different dyes were added to samples of simulated evaporation pond liquor to achieve a concentration of 20 ppm. Those dyes which completely dissolved within 5 minutes with stirring at 22° C were deemed to possess "good" solubility, whereas dyes having "poor" solubility either did not completely dissolve in the above period and/or reacted with a component of the sample liquor to form an undesirable precipitate. The samples were then subjected to visible (350-750 nm) and infrared (750-1350nm) radiation and the median absorption by each sample was determined using the test method discussed in Example 1. The data thereby obtained are summarized in Table VII.

As shown in Table VII, Permanent Black B Paste and Alizarine Cyanine Green were unacceptable as evaporation accelerators due to their reaction with components of the simulated evaporation pond liquor. The Phenamine Sky Blue did not significantly increase the absorption of visible and infrared radiation, and its performance as a solar evaporation accelerator was therefore also unacceptable.

TABLE VII

| Dye | Median Absorption of Visible and Infrared Radiation (%) | Net Increased Absorption (%) | Solubility |
|---|---|---|---|
| None | 30.5 | — | — |
| Nigrosine 128B (C.I. No. 50420) | 42.8 | 12 | Good |
| Naphthol Green B (C.I. No. 10020) | 44.7 | 14 | Good |
| Phenamine Sky Blue | 30.6 | — | Good |
| Permanent Black B Paste (C.I. No. 504115B) | 38.9 | 8 | Poor[1] |
| Alizarine Cyanine Green (C.I. No. 61565) | — | — | Poor[2] |

[1] black particle precipitate formed
[2] green floc precipitate formed

EXAMPLE 8

To determine the light stability of various dyes in simulated evaporation pond liquor solutions of simulated evaporation pond liquor containing 20 parts per million dye were prepared in loosely capped pint bottles and exposed to sunlight outdoors in Syracuse, New York, for a period of 4 days. The median absorption of light (visible and infrared radiation) by each sample was measured using the test method described in Example 1. Data are set forth in Table VIII.

TABLE VIII

| Days Exposure to Sunlight | Distilled Water | Median Absorption of Visible and IR Energy (in %) Using Indicated Dye | | | |
|---|---|---|---|---|---|
| | | None | Naphthol Green B | Nigrosine 128B | Permanent Black B Paste |
| 0 | 29.0 | 30.6 | 44.7 | 42.8 | 38.9 |
| 4 | 32.9 | 33.1 | 40.2 | 39.7 | 31.4 |
| Net Increase (+) or Decrease (−) in Absorption (after 4 days) | +3.9 | +2.5 | −4.5 | −3.1 | −8.5 |
| Approx. Decay Rate (% Absorption per day) | — | — | −1.1 | −0.8 | −2.1 |

Although certain preferred embodiments of the invention have been disclosed for purpose of illustration, it will be evident to one skilled in the art that various changes and modifications may be made therein without departing from the spirit and scope of the invention.

We claim:

1. A process for increasing the rate of solar evaporation of water from an alkaline trona-process waste liquor which comprises introducing to the waste liquor an effective amount of a dye selected from the group consisting of Acid Black 2, and Acid Green 1, and subjecting the resulting mixture to solar radiation for evaporation of water therefrom.

2. The process of claim 1 wherein the dye is introduced to said waste liquor in an amount of from about 2 to 2000 ppm, basis the liquid volume of the waste liquor as equivalent weight of water.

3. The process of claim 1 wherein the dye is Acid Black 2.

4. The process of claim 1 wherein the dye is Acid Green 1.